United States Patent [19]

Yeo et al.

[11] Patent Number: 5,354,076

[45] Date of Patent: Oct. 11, 1994

[54] CHUCK DRAW ROD CONNECTOR

[75] Inventors: Gary L. Yeo, Seneca Falls; Dennis W. Walowsky, Auburn, both of N.Y.

[73] Assignee: Goulds Pumps, Incorporated, Seneca Falls, N.Y.

[21] Appl. No.: 146,456

[22] Filed: Nov. 1, 1993

Related U.S. Application Data

[63] Continuation of Ser. No. 980,683, Nov. 24, 1992, abandoned.

[51] Int. Cl.⁵ ............................................. B23B 31/26
[52] U.S. Cl. ..................................... 279/110; 409/233
[58] Field of Search ........................ 24/453, 607, 628; 292/259, 332; 403/325, 328; 411/348; 279/106, 109, 110, 118, 119, 121, 143, 158; 409/233

[56] References Cited

U.S. PATENT DOCUMENTS

| | | | |
|---|---|---|---|
| 2,399,581 | 4/1946 | Spooner | 24/453 X |
| 3,117,484 | 1/1964 | Myers | 411/348 |
| 3,176,812 | 3/1965 | Pattison | 292/252 X |
| 3,186,961 | 6/1965 | Moberg | 292/252 X |
| 3,469,718 | 9/1969 | Betts | 403/325 |
| 3,507,528 | 4/1970 | Desmarshais | 403/325 X |
| 4,127,966 | 12/1978 | Schmidt | 292/252X |
| 4,144,794 | 3/1979 | Silverman et al. | 24/607 X |
| 4,850,734 | 7/1989 | Naumec et al. | 403/325 X |
| 5,035,557 | 7/1991 | Kohlbauer et al. | 409/233 |
| 5,066,178 | 11/1991 | Peuterbaugh | 409/233 |

FOREIGN PATENT DOCUMENTS

| | | | |
|---|---|---|---|
| 458491 | 9/1925 | Fed. Rep. of Germany | 411/348 |
| 569050 | 4/1924 | France | 411/348 |
| 717056 | 10/1954 | United Kingdom | 292/252 |
| 881088 | 11/1961 | United Kingdom | 24/607 |
| 906832 | 9/1962 | United Kingdom | 411/348 |

*Primary Examiner*—Steven C. Bishop
*Attorney, Agent, or Firm*—Brezina & Ehrlich

[57] ABSTRACT

An assembly for releasably connecting the machine draw rod to a chuck draw rod both of which rotate about an axis, the assembly including a female member having a first end operatively attached to the machine draw rod member and defining a receptacle, the receptacle having at least one locking recess. A male member has a first end operatively attached to the chuck draw rod and includes an insertion portion opposite the first end which is adapted to be inserted into the receptacle. The insertion portion defines at least one detent opening. The male member includes at least one detent ball positioned within one detent opening and which is movable from an unlocked position to a locked position with respect to the locking recess when the insertion portion is inserted into the receptacle. The male member also includes a plunger for moving the detent balls from the unlocked position into the locked position when the plunger is in a forward position. The removable connector assembly also includes a spring which operatively contacts the plunger to yieldably retain the plunger in the forward position.

13 Claims, 4 Drawing Sheets

CHUCK DRAW ROD CONNECTOR

This is a continuation of application Ser. No. 07/980,683, filed on Nov. 24, 1992, now abandoned.

BACKGROUND OF THE INVENTION

The present invention relates to releasable connectors, and more particularly to a device for releasably connecting the machine draw rod on a production lathe to the chuck draw rod of a power actuated chuck.

Machine lathes are used for the production of varying sizes of components which are normally symmetrical about their axis of rotation. The main cutting motion is made by rotating a workpiece about an axis and the feed motion is made by a cutting tool which tracks longitudinally and radially alongside the rotating workpiece. Chucks having controllable, radially displacable jaws are frequently employed to hold the workpiece. The chucks in turn are attached to a spindle which is rotated by the lathe to produce the rotation of the workpiece.

On production lathes, power actuated chucks are generally used. The gripping jaws on power actuated chucks are actuated in response to the longitudinal movement of a chuck draw rod centrally located within the chuck. The chuck draw rod is in turn connected to a machine draw rod which longitudinally extends within the spindle and which can be controllabiy reciprocated by the lathe operator. The chuck draw rod is typically connected to the machine draw rod by a bolt or draw screw which is threaded axially through the chuck draw rod and received in a tapped hole extending into a forward end of the machine draw rod.

In most production operations, the chuck is constantly removed and exchanged with other chucks or chucking fixtures to provide versatility for a wide range of part sizes to be machined. A common drawback of the bolted connection between the machine draw rod and the chuck draw rod is that the screwing and unscrewing of the bolt causes the internal threads of the machine draw rod to wear or become damaged. This necessitates retapping or replacement of the draw rod which is a time consuming process. A related drawback is that the rotation of the draw screw is a time consuming process and reduces the efficiency of the machining operation.

It is therefore an object of the present invention to provide an apparatus for removably connecting the machine draw rod to the chuck draw rod in a machine lathe without requiring the use of a threaded connection device which can be damaged during replacement of the chuck.

A further object of the present invention is to provide an apparatus which allows a chuck for a machine lathe to be removed and/or installed very quickly. A related object is to provide such an apparatus which can withstand the high push/pull forces generated and applied to the draw rod when chucking a part.

SUMMARY OF THE INVENTION

The above objects and more are provided by an assembly in a machine lathe for releasably connecting the machine draw rod to a chuck draw rod both of which rotate about an axis. The assembly includes a female member having a first end operatively attached to the machine draw rod member and defining a receptacle, the receptacle having at least one locking recess. A male member has a first end operatively attached to the chuck draw rod and includes an insertion portion opposite the first end which is adapted to be inserted into the receptacle. The insertion portion defines at least one detent opening. The male member includes at least one detent ball positioned within the at least one detent opening, which detent ball is movable from an unlocked position to a locked position with respect to the at least one locking recess when the insertion portion is inserted into the receptacle. The male member also includes a plunger for moving the detent balls from the unlocked position into the locked position when the plunger is in a forward position.

The removable connector assembly also includes a spring which operatively contacts the plunger to yieldably retain the plunger in the forward position.

DESCRIPTION OF THE PREFERRED EMBODIMENT

Figure 1:
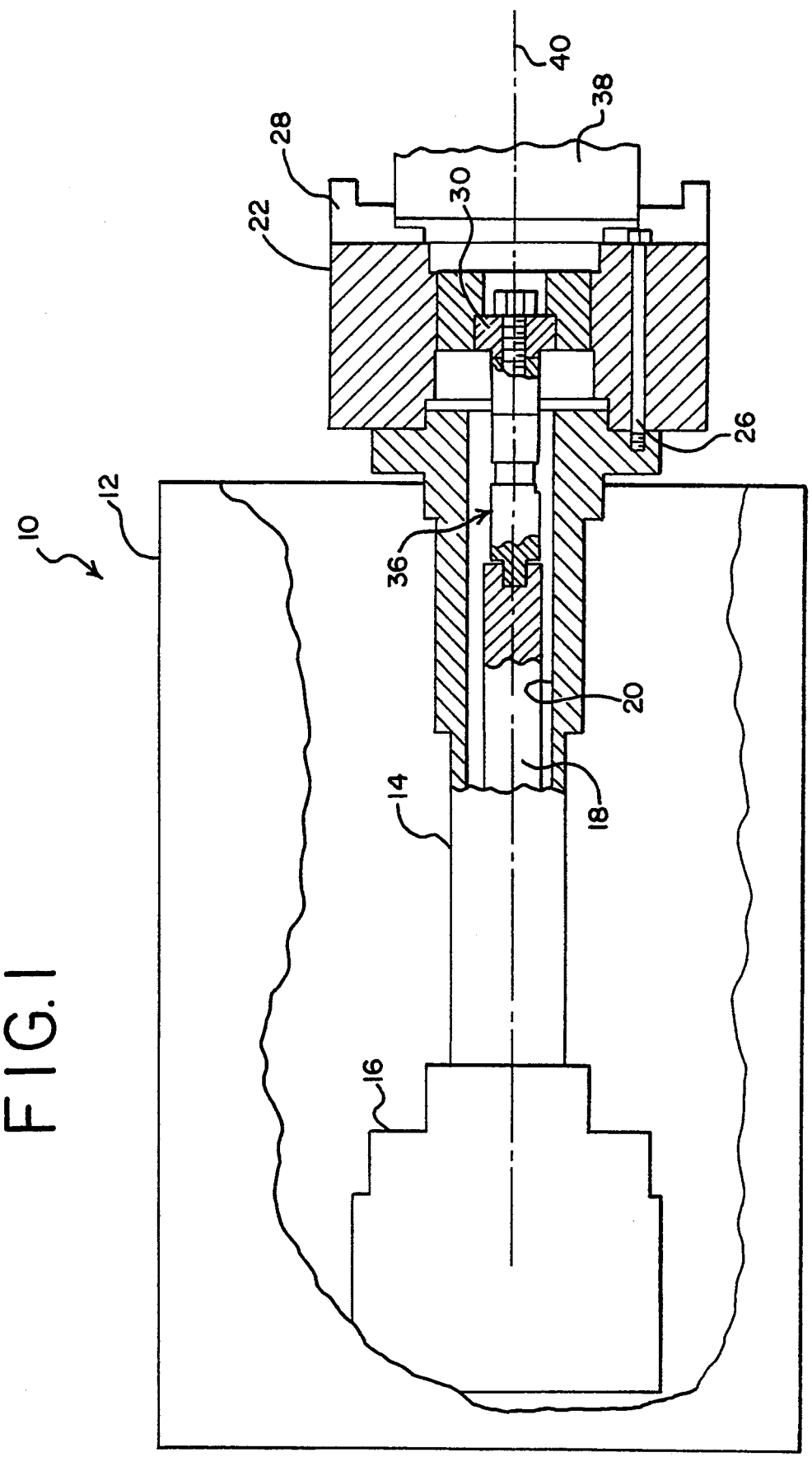
FIG. 1 is a fragmentary view with cutaway portions of a machine lathe employing the releasable connector of the present invention.

As disclosed in FIG. 1, a machine lathe 10 includes a head stock 12 and a spindle 14 extending out of the head stock and rotatably mounted within the head stock. Attached to the spindle and located within the head stock is an actuating cylinder 16. Operatively attached to the actuating cylinder typically by a screwed connection is machine draw rod 18 which extends within a tube 20 defined by the spindle 14. A power or automatic chuck 22 is mounted on the spindle 14 by mounting screws 26 which are inserted longitudinally through apertures in the chuck and threadingly inserted into corresponding apertures in the spindle 14. Thus, rotation of the spindle 14 causes a corresponding rotation of the chuck 22. The chuck 22 includes work-holding jaws 28 which are operated by the axial movement of a centrally located chuck draw rod 30.

A draw rod connector 36, as described below, operatively and releasably connects the machine draw rod 18 to the chuck draw rod 30, whereby longitudinal movement of the machine draw rod in turn causes a longitudinal or axial movement of the chuck draw rod. The longitudinal movement of the chuck draw rod 30 radially advances and retracts the jaws 28 to allow the chuck 22 to grip and hold a workpiece 38 for internal dimensioning and external dimensioning chucking.

The cylinder 16, machine draw rod 18, spindle 14, connector 36 and chuck 22 rotate as a unit about a longitudinal axis 40. The details of the head stock 12, cylinder 16, machine draw rod 18, automatic chuck 22 and spindle 14 are not presented since they are devices known to the person skilled in the art. However, the releasable connector 36 is not previously known and is disclosed in FIGS. 2, 3 and 3A.

Figure 2:
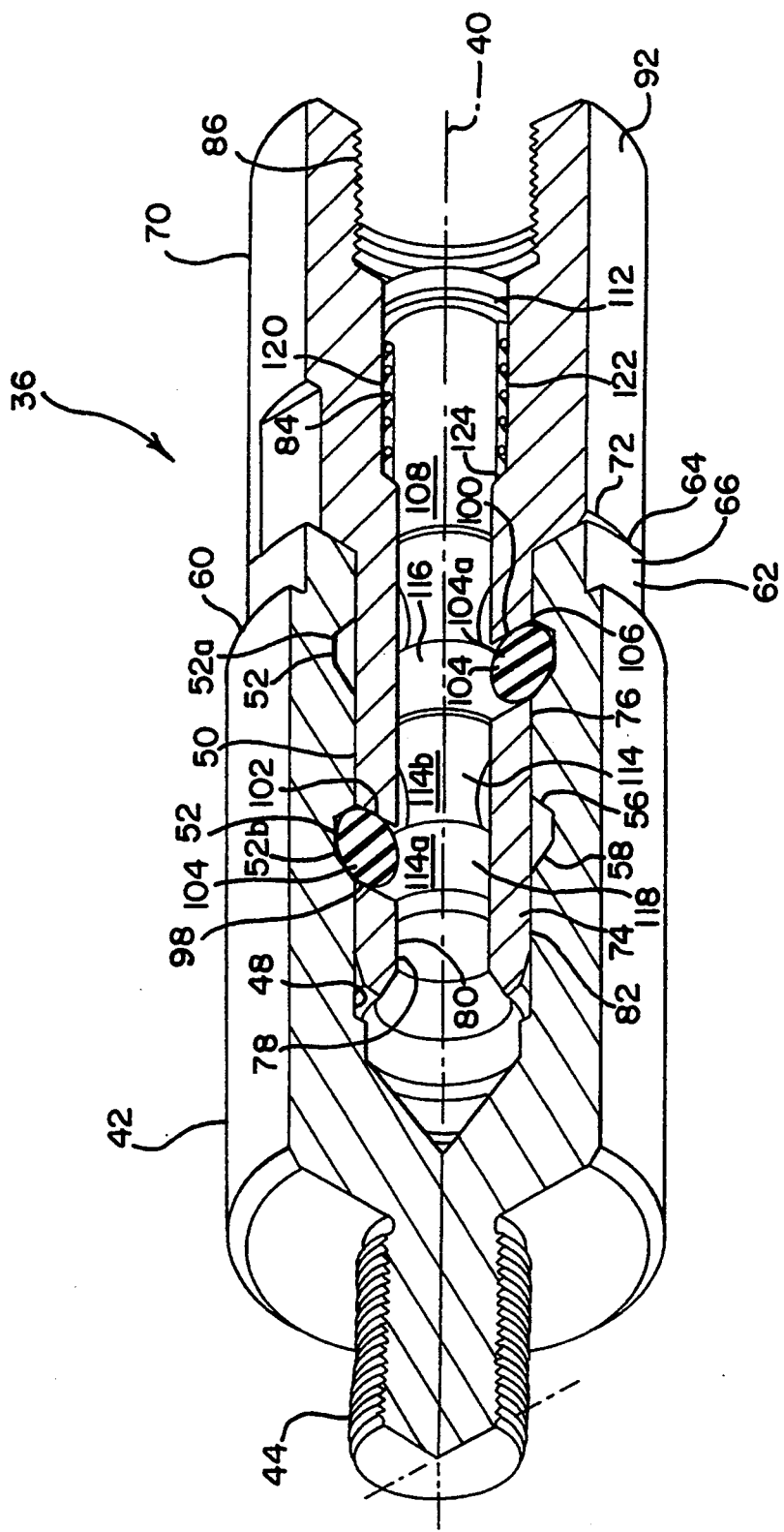
FIG. 2 is a perspective, partially cut-away view of the preferred embodiment of the releasable connector of the present invention.
Figure 3:
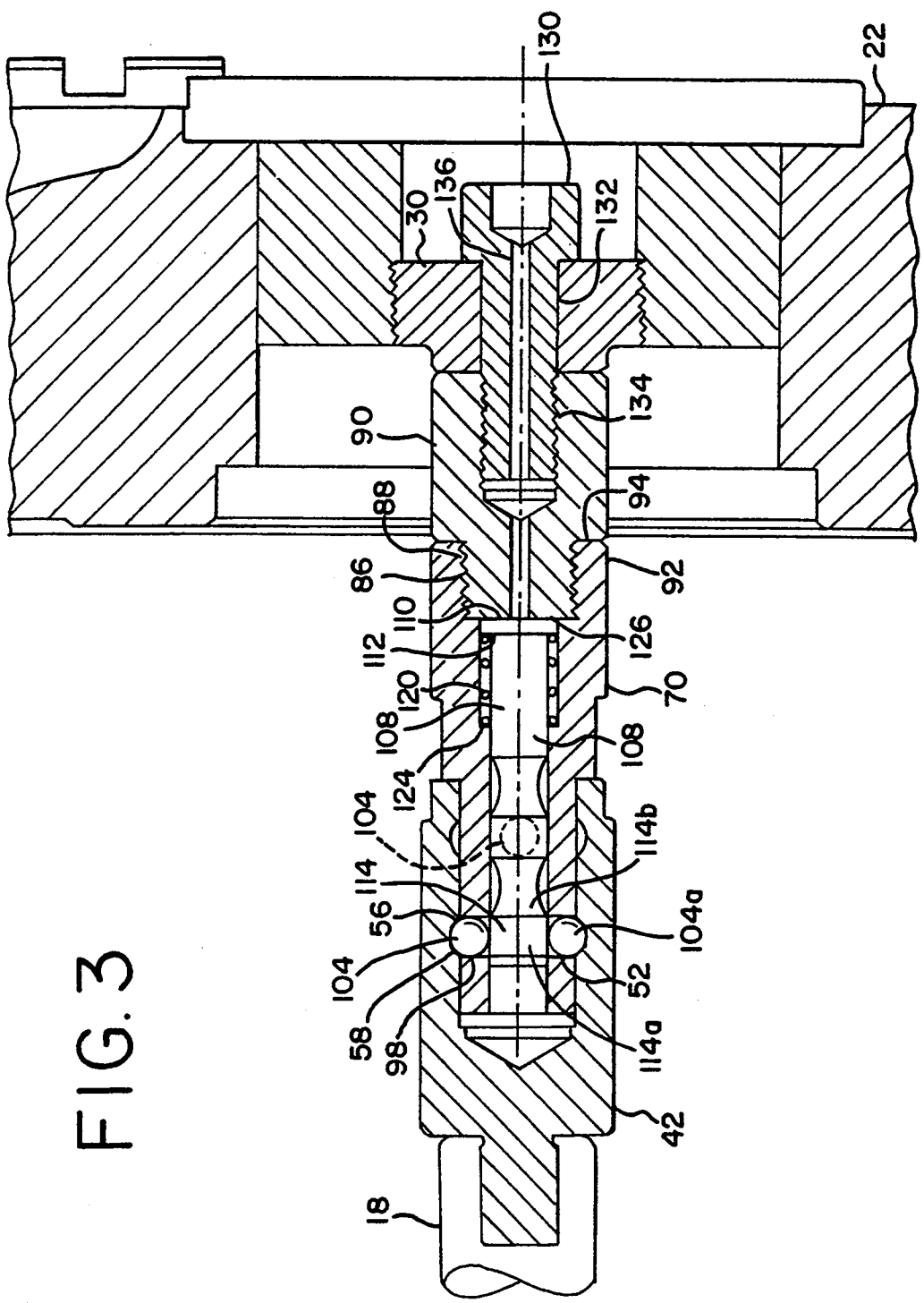
FIG. 3 is a fragmentary vertical section view of the present invention operatively connecting a chuck draw rod and machine draw rod which form part of an engine lathe.

Referring to FIG. 2, the connector 36 includes a longitudinally extending female sleeve 42 which preferably is symmetrical about the axis 40. The sleeve 42 has a rearward threaded cylindrical portion 44 which is threadably inserted into a drilled and tapped hole 46 defined by machine draw rod 18 (FIG. 3). The female sleeve 42 has an inner surface 48 which defines a receptacle 50. Within the receptacle is a locking recess 52 and preferably a forward locking recess 52a and a rearward locking recess 52b. The forward and rearward locking recesses 52a, 52b may extend circumferentially around the receptacle 50 transversely to the axis 40 and may also include a forward and rearward tapered shoulder 56 and 58. Extending about a forward end 60 of the female sleeve 42 is an annular flange 62 having a forward seating surface 64. The outer surface 66 of the annular flange 62 may be hexagonally formed to allow common wrenches (not shown) to rotate the female sleeve 42 for threaded insertion of the rearward portion 44 into the hole 46.

The releasable connector 36 also includes a male member 70 having a radially extending shoulder 72 adapted to be engaged by the forward seating surface 64 of the female sleeve 42. The male member includes a tubular insert portion 74, which includes an outer surface 76 dimensioned to allow the insert portion 74 to be slidingly inserted into receptacle 50.

The male member 70 also includes an inner surface 78 which defines an orifice 80 which extends longitudinally and co-axially with the axis 40 through the male member 70. Orifice 80 includes a rearward portion 82, a middle counterbore portion 84, and a forward counterbore portion 86. Referring to FIG. 3, the forward counterbore 86 is tapped to threadingly receive a rearward bolt portion 88 of an adapter 90 which is in turn threadingly connected to the chuck draw rod 30. A forward end 92 of the male member 70 contacts a radially extending shoulder 94 of the adapter.

Referring to FIG. 2, the insert portion 74 of the male member 70 defines a circular detent opening 98 radially extending from the outer surface 76 to the inner surface 78. The insert portion 74 preferably defines a plurality of detent openings arranged in a forward pair 100 and a rearward pair 102. In each pair of detent openings 100, 102, one of the detent openings 98 is radially aligned with, and located on the insert portion 74 180 degrees from the other of the detent openings. Also, the forward pair 100 is circumferentially offset 90 degrees relative to the axis 40 from the rearward pair 102.

A detent ball 104 is positioned in each of the detent openings 98 and is dimensioned to be radially movable within the detent opening. The edge 106 of the outer surface 76 about the detent opening 98 is preened to slightly constrict the detent opening and retain the detent ball 104 within the detent opening when the insert portion 74 is removed from the receptacle 50.

When a portion of the detent ball 104 extends outside the outer surface 76 of the insert portion 74 and engages the corresponding locking recess 52 by preferably co-engaging the locking shoulders 56 and 58, the detent ball is in a locked position 104a, as in FIG. 2. The locked position 104a prevents relative longitudinal, or axial, movement between the male member 70 and female sleeve 42. When the detent ball 104 is positioned inward of the outer surface 76, the detent ball is in an unlocked position indicated at 104b in FIG. 3A. When the detent ball 104 is in the unlocked position 104b, the insert portion 74 of the male member may be slidingly, longitudinally removed from the receptacle 50 and thus, the female sleeve 42.

Referring to FIG. 2, disposed within the forward counterbore 86 and middle counterbore 84 of the orifice 80 is a plunger 108, which includes a forward end 110 having a radially extending lip 112 in gliding engagement with the middle counterbore 84. The plunger 108 also includes a camming portion 114, and preferably a forward camming portion 116 and a rearward camming portion 118, which correspond to the forward and rearward pairs 100, 102 of detent openings 98. The camming portion 114 includes a cylindrical locking surface 114a and a concavely curved release or indented surface 114b. The locking surface 114a is radially dimensioned to be in gliding engagement with the rearward portion 82 of the orifice 80.

Figure 3A:
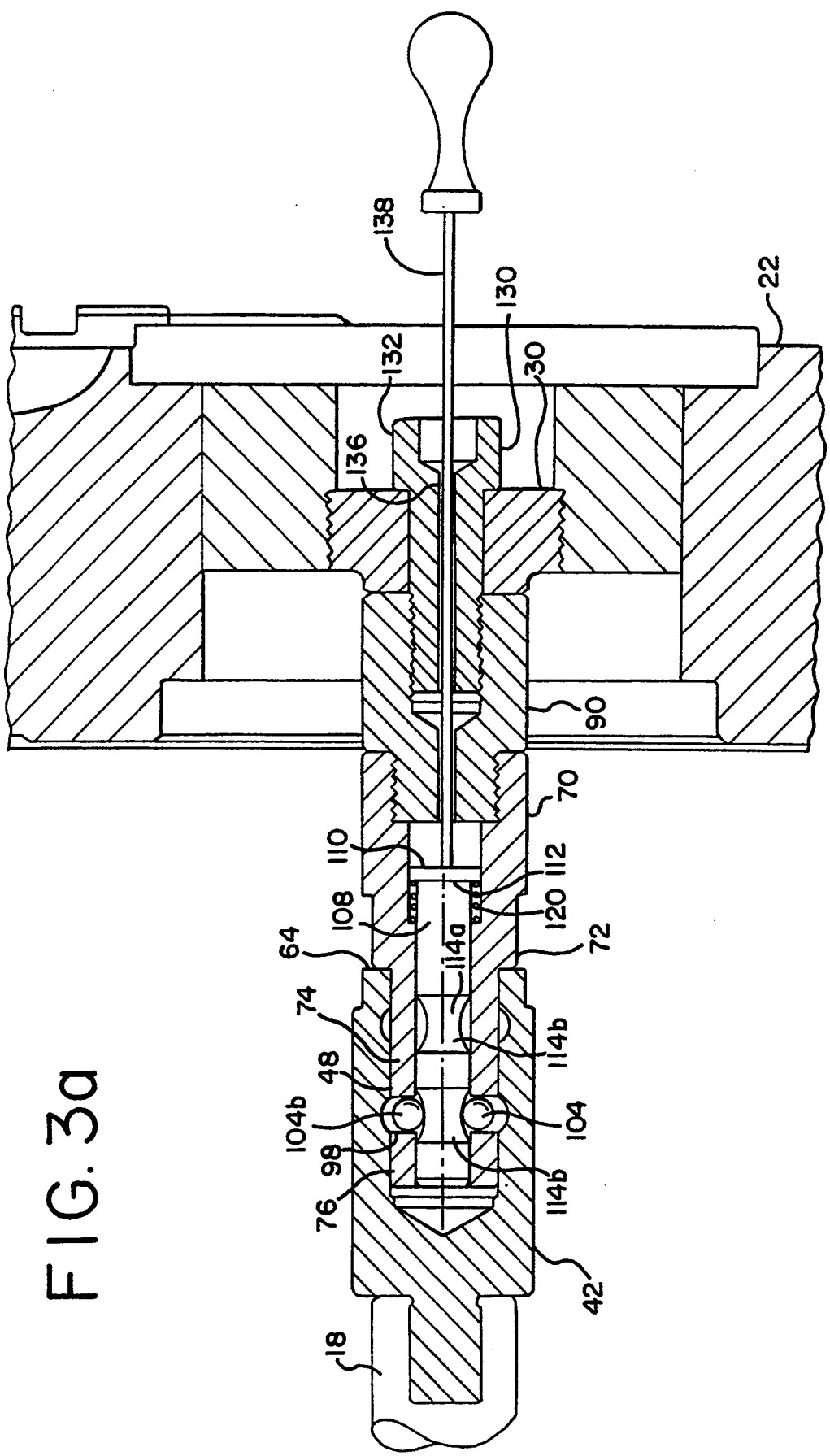
FIG. 3A is a view corresponding to FIG. 3 with the releasable connector in an unlocked condition for disconnecting the chuck draw rod from the machine draw rod.

When the plunger 108 is in a forward position, as shown in FIG. 3, the locking surface 114a engages the detent ball 104 and locks the detent ball in the locked position 104a. As shown in FIG. 3A, when the plunger 108 is in a rearward position, the release surface 114b is axially positioned adjacent the detent opening 98a. The release surface 114b is dimensioned to allow inward radial movement of the detent ball 104 to the unlocked position 104b When the detent ball 104 is in the unlocked position 104b and the plunger 108 is displaced in a forward axial direction, the release surface 114b engages the detent ball 104 and smoothly cams the detent ball toward engagement with the locking surface 114a, thereby moving the detent balls 104 into the locked position 104a as shown in FIG. 3.

Referring again to FIG. 2, the male member 70 also includes a spring 120 circumferentially disposed about the plunger 108 and positioned in a space 122 formed between the middle counterbore 84 and the plunger 108 rearward of the radial lip 112. The spring 120 contacts the radial lip 112 and an inner radially extending seating surface 124 of the male member 70 to yieldably bias the plunger 108 in the forward oz rightward position, which causes the detent ball 104 to be engaged by the locked surface 114b in the locked position 104a (FIG. 3).

Referring to FIG. 3, during the threaded insertion of the bolt portion 88 of the adapter 90 into the forward counterbore 86, a rearward end surface 126 of the bolt portion engages the forward end 110 of the plunger 108 and axially displaces the plunger in a rearward direction. When locating shoulder 94 of the adapter 90 contacts the forward end 92 of the male member 70, the plunger 108 is positioned in the forward position and the spring 120 contacts the seating surface 124 and radial lip 112. The spring 120 is slightly compressed, thereby exerting a forwardly directed force on the plunger 108 to retain the plunger in the forward position.

The forward end of the adapter 90 is in abutting contact with a rearward end of chuck draw rod 30. Adapter 90 is held in abutting contact with chuck draw rod 30 by a draw screw 130 which is inserted through a central bore 132 in the chuck draw rod 30 and threadingly received in a central aperture 134 defined by the adapter 90.

Extending axially through and defined by the draw screw 130 and adapter 90 is an actuating tube 136. The actuating tube 136 allows the sliding insertion of an actuating rod 138 (FIG. 3A) which contacts the forward end 110 of the plunger 108.

As shown in FIGS. 3 and 3A, in operation, the present invention contemplates that the female sleeve 42 remains threadingly attached to the machine draw rod 18 during interchanging of various chucks 22. The male member 70 is threadingly attached to the adapter 90 which in turn is connected to the chuck draw rod 30 by the draw screw 130. Referring to FIG. 3A, to insert the insert portion 74 into the receptacle 50, the actuating rod 138 is slidingly inserted into the actuating tube 136 until the actuating rod contacts the forward end 110 of the plunger 108. Further movement of the actuating rod 138 until the spring 120 is fully compressed forces plunger 108 into the rearward or leftward position, which axially positions the release surfaces 114b adjacent the detent openings 98. The release surfaces 114b allow each of the detent balls 104 to move radially inward to the unlocked position 104b. The insert portion 72 is then inserted into the receptacle 50 until the forward seating surface 64 of the female sleeve 42 contacts the shoulder 72 of the male member 70. The detent openings 98 are thereby positioned beneath the corresponding locking recess 52.

If the plunger 108 is not fully forced into the rearward position, whereby the release surface 114b is only partially axially positioned, adjacent the detent opening 98 and a portion of the detent ball 104 extends outside the outer surface 76 of the male member 70, the inner surface 48 of the female sleeve 42 applies a contact force on the detent ball 104 during insertion of the insert portion 74 into the receptacle 50. This contact force is transmitted by the detent ball 104 to the concavely curved release surface 114b. The contact force applied on the release surface 114b forces the plunger 108 fully into the rearward position, thereby allowing the detent balls 104 to move to the unlocked position 104b and the insert portion 74 to be inserted into the receptacle 50.

The actuating rod 138 is then slidingly withdrawn from the actuating tube 138. Referring to FIG. 3, the force exerted by the compressed spring 120 on the radial lip 112 forces the plunger 108 forward until the forward end 110 contacts the bolt portion 88 of the adapter 90 and the plunger 108 is in the forward position. As the plunger 108 moves forward, the release surface 114b cammingly engages the detent balls 104 to move the balls radially outward until the detent balls co-engage the forward tapered shoulder 56 and rearward tapered shoulders 58 of the corresponding locking recesses 52, thereby positioning the detent balls 104 in the locked position 104b Further forward movement of the plunger 108 into the forward position axially positions the locking surfaces 114a adjacent the detent openings 98, and the locking surfaces engage the detent balls 104 in the locked position 104a. Thus, the male member 70 is prevented from longitudinal movement relative to the female sleeve 42 and the machine draw rod 18 and chuck draw rod 30 are operatively connected.

The process to remove the insert portion 74 from the receptacle 50, and thereby release the chuck draw rod 30 from operative connection with the machine draw rod 18, is similar to the process for insertion of the insert portion into the receptacle described above. The actuating rod 138 is inserted into the actuating tube 136 and forces the plunger 108 into the rearward position. The detent balls 104 move into the unlocked position 104b and the insert portion 74 is slidingly removed from the receptacle 50. The chuck draw rod 30 is thereby released from the machine draw rod 18.

The draw rod connector 36 thus provides quick operative connection and disconnection between the chuck draw rod 30 and the machine draw rod 18 without requiring the use of a threaded connection. Also, as various chucks 22 will each have a male member 70 operatively connected to the chuck draw rod 30, chucks can be interchanged very quickly. Further, because the motion required to lock and unlock the male member 70 from the female sleeve 42 is an axial insertion and movement of the actuating rod 138, the chuck draw rod 30 can be operatively disconnected from the machine draw rod 18 without obstruction caused by the various chucking tools and their placement during the machining operations.

A specific embodiment of the novel chuck draw rod connector according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

I claim:

1. An assembly for operation of the jaws of an automatic chuck attached to a spindle of a machine lathe, the assembly comprising:

a machine draw rod slidably disposed in an orifice extending within the spindle;

chuck draw rod means operatively attached to the jaws for general radial advancement and retraction of the jaws;

connection means for removably connecting the machine draw rod to said chuck draw and rod and positively locating said machine draw rod relative to said chuck draw rod means, said connection means including:

a female member having a first end operatively attached to one of said machine draw rod and said chuck draw rod means and having an inner surface and an outer surface, said inner surface defining a receptacle, said receptacle including at least one locking recess, a male member having a first and operatively attached to the other of said machine draw rod and said chuck draw rod means and including an insertion member opposite said first end and adapted to be inserted into said receptacle, said insertion member defining at least one detect opening extending from an inner surface to an outer surface of said insertion member, at least one detent means within said at least one detent opening movable from an unlocked position to a locked position with respect to said at least one locking recess when said insertion member is inserted into said receptacle, said male member including lunger means for moving said detent means from said unlocked position into said locked position and for allowing said detent means to move from said locked position into said unlocked position.

2. The assembly of claim 1 further including spring means in operative contact with said plunger means to yieldably retain said detent means in said locked position.

3. The assembly of claim 2 wherein said spring means is in operative contact with said male member.

4. The assembly of claim 1 wherein said locking recess extends circumferentially around said receptacle transversely to said axis.

5. The assembly of claim 1 wherein said receptacle is substantially tubular.

6. The assembly of claim 1 wherein said detent means comprise spherically shaped balls.

7. The assembly of claim 2 wherein said insertion portion includes retaining means for retaining said at least one detent means within said at least one detent opening when said insertion member is removed from said receptacle.

8. The assembly of claim 3 wherein said male member defines a longitudinal orifice extending through said male member coaxially aligned with said axis, said longitudinal orifice defining said inner surface, said plunger means being slidably disposed within said orifice.

9. The assembly of claim 1 wherein said insertion member defines a plurality of said at least one detent opening with each of said at least one said detent opening having said at least one detent means.

10. The assembly of claim 1 wherein said insertion member defines at least one pair of said at least one detent opening, said at least one detent means movable in each of said at least one detent opening, and one of said at least one detent opening being radially aligned and oppositely disposed from the other of said at least one detent opening in said at least one pair.

11. The apparatus of claim 10 wherein said insertion member defines at least two pairs of said at least one detent opening, with at least one of said pairs being radially offset with respect to another of said pairs.

12. The apparatus of claim 1 wherein said chuck draw rod means forms a tube means extending through said chuck draw rod means for allowing a rod means to extend through said tube means and operatively engage said lunger means and move said plunger means to allow said detent means to move from said locked position into said unlocked position.

13. The apparatus of claim 12 wherein said tube means is generally axially aligned with said plunger means.

* * * * *